United States Patent Office 2,706,344
Patented Apr. 19, 1955

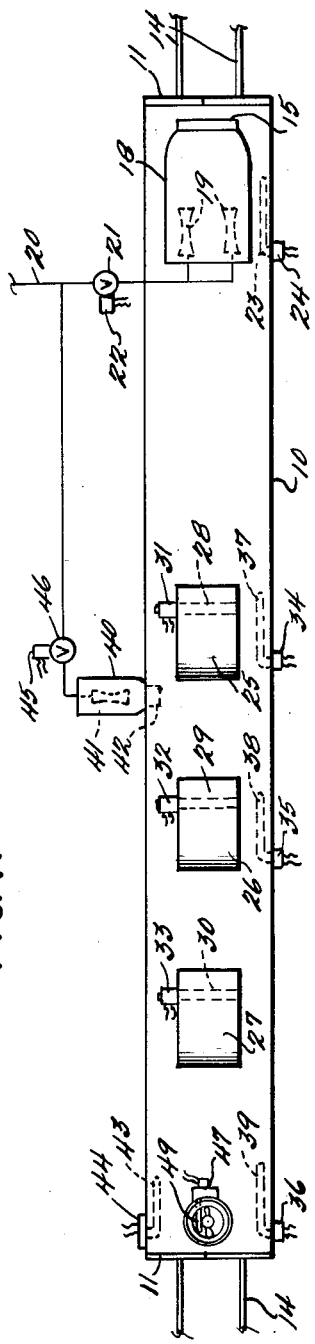

2,706,344
METHOD OF CONTROLLED AIR SEASONING OF WOOD

Joseph A. Vaughan, Atlanta, Ga., assignor to Southern Wood Preserving Company, Atlanta, Ga., a corporation of Georgia Application March 11, 1953, Serial No. 341,635

4 Claims. (Cl. 34—31)

This invention relates to a method of air seasoning wood, such a green crossties, poles, crossarms, and lumber, to reduce the moisture content to a point suitable for subsequent preservative treatment or to reduce the subsequent shipping weight.

This application relates to certain improvements in the method disclosed in my application, Ser. No. 297,925, filed July 9, 1952, for Method of Controlling Air Seasoning of Wood.

The main object of the invention is to provide a greatly improved and economical method of air seasoning wood, as above set forth, to reduce the time required for drying to a fraction of the time usually required for seasoning in the open air and to eliminate deterioration or degrade, due to abnormal checking and decay. The idea is to reduce the drying time by so controlling drying conditions as to avoid such deterioration.

Another object of the invention is to provide a relatively simple and practical method of drying wood in a tunnel drier, using a stream of atmospheric air heated to a substantially constant optimum temperature and controlling the drying temperature at different locations or zones in the tunnel in response to changes in the temperature of the outbound air.

A further object of the invention is to provide an economical method of air seasoning wood in a long drying tunnel by maintaining the temperature of the inbound air stream at a predetermined drying temperature and so controlling the temperature conditions in the tunnel that the temperature of the outbound air stream will be maintained at a predetermined minimum which will insure initial drying of charges of wood introduced into the tunnel at the outbound air steam end. The idea is to obtain a maximum heating efficiency by preventing the moisture laden air from being discharged while it still has some useful drying capacity.

Still another object of the invention is to provide a most economical and effective method of air seasoning charges of wood in a long tunnel by delivering fresh air to the tunnel at different zones along the tunnel in response to an abnormal or predetermined increase in the temperature of the outbound air stream. The idea is to maintain a desirable rate of drying of a charge of wood in a tunnel of any given length, regardless of the initial moisture content of the wood, thus accommodating the length of the tunnel to a particular charge of wood.

Another object of the invention is to provide a method of air seasoning wood, as above set forth, which makes it possible to employ relatively simple automatic control equipment.

A further object of the invention is to provide a method of air seasoning wood in a tunnel, as above set forth, which makes it possible to vary the velocity of the drying air in different parts of the tunnel so as to obtain the most efficient use of the contained heat and to effect the desired rate of drying.

Other objects and advantages will appear in the following specification, when considered in connection with the accompanying drawings, wherein:

Fig. 1 is a diagrammatic plan view of a tunnel drier adapted to practice the method;

Fig. 2 is a vertical sectional view of the drier shown in Fig. 1; and

Figure 3:
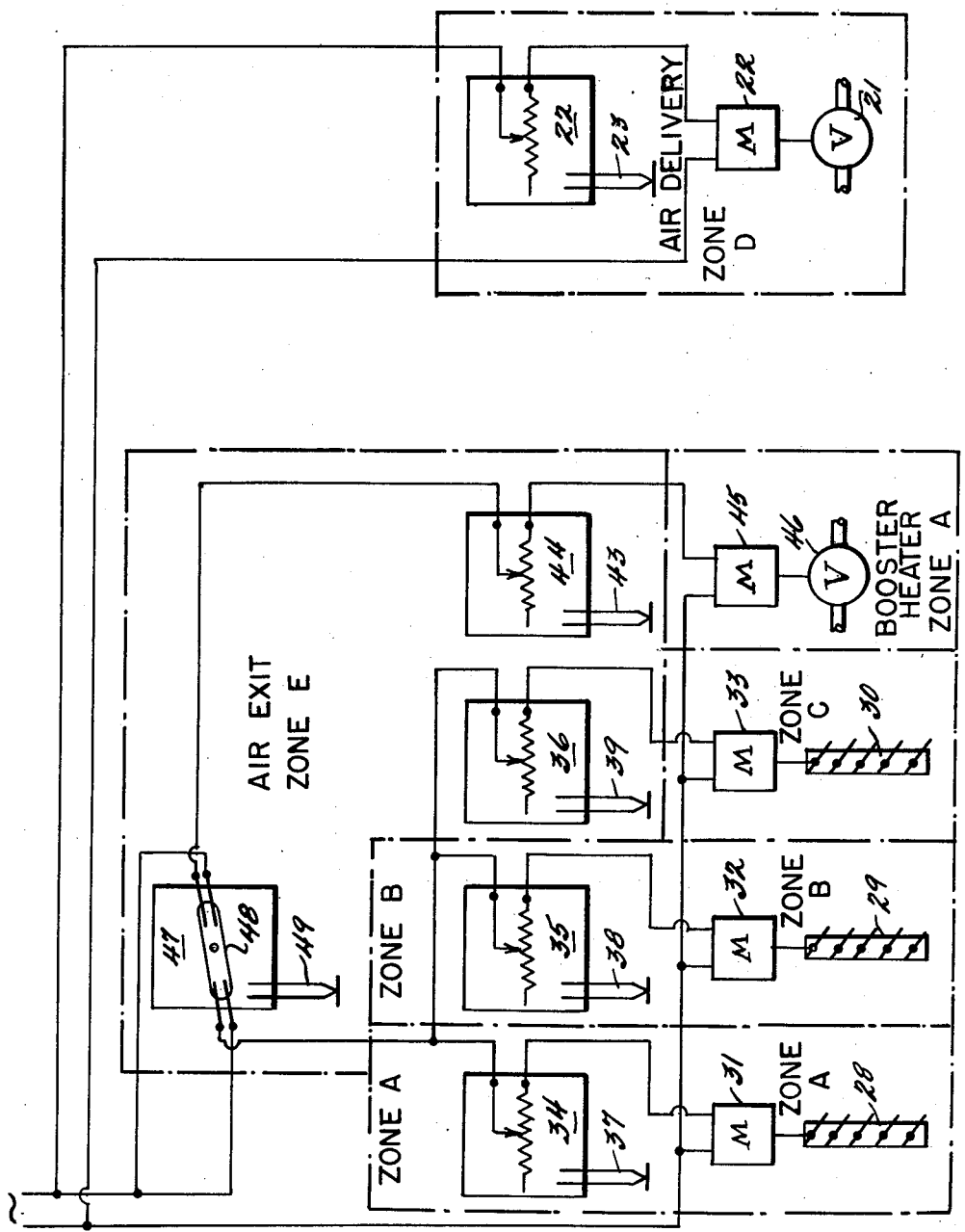
Fig. 3 is a simplified wiring diagram of electrical control apparatus suitable for practicing the method.

As stated in my aforesaid copending application, the method of controlling air seasoning is designed to reduce the time normally required for seasoning wood in the open air and to eliminate deterioration and degrade, due to abnormal checking, decay and the like, which may occur during natural seasoning. The present method provides important improvements in the operation of tunnel driers to dry charges of wood most effectively.

In accordance with this invention, the drying air is delivered or introduced into a drying tunnel, preferably in the form of an insulated building 10. While the building may have two or more parallel tunnels to provide a multi-run unit, it is shown as having a single tunnel.

The volume of wood to be dried and the air volume and velocity desired, are factors which influence the dimensions of the tunnel. For drying crossties, poles, and the like, the tunnel may be ten to fifteen feet square in cross section and about three hundred to seven hundred feet long, to permit successive charges or a number of stacks of the crossties, poles, or other materials, to be conveyed through the tunnel.

The tunnel is shown as having suitable doors 11 at its opposite ends and the charges of wood, in the form of stacks 12, are preferably loaded on trams 13 conveyed through the tunnel on tracks 14. The pieces in the stacks are spaced apart to permit free passage or circulation of drying air in contact with all of them. The construction and arrangement are such that loaded trams of green wood will be introduced into the tunnel in succession as tram load of dried material are removed, so that the drying process is continuous.

Drying air is introduced at a substantially constant rate into the tunnel at one end through a conduit 15, shown as being on top of the tunnel, and is discharged from the other end through an exit conduit 16. An exhaust fan 17 is shown in the exit conduit to cause induced draft of the drying air through the tunnel. However, it is contemplated that a forced draft fan may be employed.

In accordance with the invention, the drying air is preheated to an optimum constant temperature of 120° F. to 160° F., in a heater 18 of any suitable type. For the purpose of illustration, burners 19 are shown as being supplied with gas by a feed pipe 20 having a valve 21 controlled by a proportioning motor 22.

The heated, inbound air introduced into the delivery end or zone D is maintained at a constant temperature by a thermo-couple 23 located in the delivery zone D and a potentiometer 24 of the Minneapolis-Honeywell type connected to control the motor 22, in a manner well known in the art.

In accordance with this invention, the temperature of the outbound air stream in the exit zone E is maintained constant at between above 70° F. and 80° F., by either introducing fresh cool air at different zones in the tunnel to reduce the temperature of the air stream, or by boosting the temperature of the air stream about midway of the length of the tunnel, both in response to variations in the temperature of the air stream in zone E. In the illustrated embodiment, fresh air is adapted to be admitted into the top of the tunnel to separated zones A, B and C, through conduits 25, 26 and 27 carrying dampers 28, 29 and 30, respectively, preferably in the form of louvers. In the present example, the zone A is located about midway of the length of the tunnel and the zones B and C are about two-thirds and five-sixths of the length of the tunnel from the delivery zone D. The location of these zones is selected so that the temperature of the drying air may be controlled as it travels through at least half the length of the tunnel before it reaches the exit end.

The dampers 28, 29 and 30 in the fresh air conduits are operated by "modutrol" motors 31, 32 and 33, respectively. The motors are controlled by potentiometers 34, 35 and 36, respectively, connected to thermo-couples 37, 38 and 39, located in the zones A, B and E, respectively. The arrangement is such that the potentiometers can be set to maintain constant and predetermined temperatures of the drying air in the separate zones. The temperature in the zone A is set between 100° F. and 125° F., in zone B, between 90° F. and 100° F., and in zone C, between 70° F. and 80° F. In the last zone C, the temperature is maintained the same as that of the outbound air in zone E. These temperatures have been found to be most effective.

When the dampers in the ducts or conduits leading to zones A, B and C are opened, fresh, unheated air is admitted through the top of the tunnel and mixes with the drying air stream to reduce its temperature and maintain the set temperature conditions in the respective zones. This results in a slight increase in velocity of the air stream, because of the reduction in the resistance to flow through the entire charge. The volume and velocity of the drying air are correspondingly reduced but without materially reducing the drying capacity of the heated air. Thus, substantially all of the sensible heat in the drying air is utilized.

In warm climates, where the atmospheric temperature on sunny days during the summer months is above that set for the outbound air, the dampers in all of the air ducts 25, 26 and 27 will be opened to admit as much warm, fresh air as possible and thereby reduce the fuel consumption and increase the efficiency of the drier.

In cold climates, or during winter months, when the atmospheric temperature is far below that set for the outbound air, it will be necessary to boost the temperature of the drying air about midway of the length of the tunnel, say, at zone A. For that purpose, a proportioning booster heat 40 having a burner 41 supplied with gas from the gas line 20, is located on one side of the tunnel to discharge heated air into a duct 42 directed across the bottom, so that the heated stream of air will rise and mix with the partially cooled air stream from the delivery zone D.

The operation of the booster heater is shown as being controlled in response to a decrease in the temperature of the outbound air stream. For that purpose, a thermocouple 43 is located in zone E and is connected to a potentiometer or regulator 44 in the circuit to the motor 45 which controls a gas valve 46. The regulator 44 is also set at the desired temperature of the outbound air stream, or between 70° F. and 80° F.

The circuits to the potentiometers or regulators for the damper motors 31, 32 and 33, and for the booster heater motor 45, are made and broken by a master circuit controller 47, which includes a double-throw, double-pole mercoid switch 48 of a well known type operated by a thermo-couple 49 in the outbound air duct 16. This controller or regulator is set to tilt the switch and close the circuits leading to the potentiometers 34, 35 and 36 which control the damper motors when the temperature in the outbound air stream ranges between, say, about 76° F. and 80° F., which is above the set temperature of the outbound air. It is also set to tilt the switch in the opposite direction to close the circuit to the potentiometer 44 which controls the booster heater motor when the temperature of the outbound air stream ranges between, say 70° F. and 74° F., which is below the desired temperature of the outbound air.

In Fig. 3, all of the motors and their regulators are shown as being connected to a common source of current and they are located in the zones depicted by heavy dot and dash lines. Incidentally, zone A is shown twice for convenience in illustrating the circuits. The first fresh air duct midway of the length of the tunnel and the booster heater are described as being located in that zone.

In practicing the method, stacks of the green wood are loaded on the trams and conveyed periodically and in succession through the tunnel. The rate of charging and removing them is determined by the drying schedule, which depends upon the species of the wood and the final moisture content desired as well as the size of the pieces. The seasoned stacks are preferably removed one or more at a time each day, according to a predetermined time schedule, and the remaining stacks are advanced in the tunnel to make room for green stacks to take the places of the ones removed. The stacks are preferably of such size that the cross section of the wood is approximately sixty percent of the cross section of the tunnel and the air space between the pieces is about forty percent of the cross section.

An illustrative example of the method will now be explained, as practiced in a tunnel drier, say, 300 feet long and 13 feet square in cross section. A drier of this size is adapted to be used for air conditioning crossties, poles and lumber.

Assume that gum crossties having an initial moisture content of about 90% are to be dried to a final moisture content of about 45%, dry weight, for subsequent preservative treatment. Tram loads of such crossties are approximately 8½ feet long, about 12 feet high, and 12 feet wide. Spacing strips in the stacks provide an air space of about 40% of the cross section of the tunnel.

The regulator 22 for the main air heater 18 is set to maintain the temperature at about 140° F. The regulator 34 for the air damper at zone A is set at 110° F.; the regulator 35 for the damper at zone B is set at 95° F.; and the regulator 36 for the damper at zone C is set at 75° F., which is the desired temperature of the outbound air stream to provide for effective initial drying. The regulator 44 in zone E is also set at 75° F. to control the operation of the booster heat 40.

The exhaust fan and main heater are started in operation and loaded trams are conveyed into the tunnel, say, two at a time, on successive days, until the tunnel is fully charged. In this example, a full charge is 34 tram loads. The drying time or cycle is determined by the volume and velocity of the drying air. In the present example, the exhaust fan is operated at a capacity of about 40,000 cubic feet per minute, causing the air flow through the stacks of wood at a velocity of about 575 feet per minute, so that the crossties will be dried to the required moisture content in approximately 17 days without damage, due to checking. This rate of drying such crossties has been found to be very effective. When the time cycle is thus established, two tram loads will be removed and two loads added every day, so that the operation will be continuous. Of course, the schedule can be changed according to time required to season different species of wood, and/or types of pieces to be dried.

When the temperature of the outbound air stream rises to from 76° to 80° F., the master mercoid switch 47 will close the circuits leading to all of the damper motors, so that their regulators can control them as hereinbefore described, to maintan substantially constant predetermined temperatures in the zones A, B and C, and thus lower the temperature of the outbound air stream. When the temperature of the outbound air stream falls to 70° F., or below, the mercoid switch will close the circuit to the booster heater motor 45, so that it can be controlled by its regulator and thus raise the temperature of the outbound air stream to 75° F.

The simplified method of control is entirely automatic so that the drier does not require a full time attendant. Furthermore, this method enables the drier to use substantially all of the effective heat contained in the drying air, thereby insuring the most economical use of the fuel consumed. Also, the method makes it possible to maintain substantially ideal drying conditions throughout the length of a drier.

Obviously, the invention is not restricted to the particular embodiment thereof herein shown and described.

What is claimed is:

1. The method of air seasoning green wood, which is characterized by periodically charging substantially uniform stacks of the wood into a long tunnel and conveying them therethrough; introducing heated air at a substantially constant temperature between about 120° F. and 160° F. into the tunnel at the stack outlet end and discharging it from the tunnel at the stack charging end; and changing the temperature of the air stream intermediate the ends of the tunnel in response to variations in the temperature of the outbound air to maintain a predetermined progressive reduction in the temperature of said air stream so that the temperature of the outbound air will be maintained between about 70° F. and about 80° F.

2. The method of air seasoning green wood, as set forth in claim 1, wherein outside air, in response to variations in the the temperature of the outbound air, is automatically introduced intermediate the ends of the tunnel to mix with the air stream and control its temperature.

3. The method of air seasoning green wood, as set forth in claim 1, wherein the temperature of the air stream intermediate the ends of the tunnel is changed by introducing outside air into a plurality of spaced zones in the tunnel with the first zone located near the middle of the tunnel and the other zones between it and the stack charging end, and by controlling the amount of outside air admitted to the respective zones so as to maintain substantially constant and efficient predetermined temperatures therein to insure proper drying conditions in each zone.

4. The method of air seasoning green wood, which is characterized by periodically charging substantially uniform stacks of wood into a long tunnel and conveying them therethrough; introducing heated air at a substantially constant temperature between about 120° F. and 160° F. into the tunnel at the stack outlet end and discharging it from the tunnel at the stack charging end; and changing the temperature of the air stream intermediate the ends of the tunnel in accordance with variations in the temperature of the outbound air to maintain a predetermined progressive reduction in the temperature of said air stream so that the temperature of the outbound air will be maintained between about 70° F. and about 80° F.

References Cited in the file of this patent

UNITED STATES PATENTS

| Number | Name | Date |
|---|---|---|
| Re. 14,528 | Andrews | Oct. 8, 1918 |
| 440,451 | Van Duzer | Nov. 11, 1890 |
| 923,092 | Valentine | May 25, 1909 |
| 1,353,591 | Hope et al. | Sept. 21, 1920 |
| 1,533,715 | Tiemann | Apr. 14, 1925 |
| 1,539,230 | Anderson | May 26, 1925 |
| 1,567,023 | Larsson | Dec. 22, 1925 |
| 2,152,312 | Jennings et al. | Mar. 28, 1939 |

OTHER REFERENCES

Accelerated Kiln Schedules, July 1951. Publication of U. S. D. A., Forest Products Laboratory, Madison, Wisconsin, Report No. D1901, 15 pages, pages 6 and 7 relied on.